United States Patent
Audart-Noel et al.

(10) Patent No.: US 8,740,136 B2
(45) Date of Patent: Jun. 3, 2014

(54) ENGINE MOUNT FOR AN AIRCRAFT, TO BE PLACED BETWEEN AN ENGINE AND AN ENGINE MOUNTING STRUCTURE

(75) Inventors: Virginie Audart-Noel, Pujaudran (FR); Pascal Gardes, Cugnaux (FR)

(73) Assignee: Airbus Operations SAS, Toulouse (FR)

( * ) Notice: Subject to any disclaimer, the term of this patent is extended or adjusted under 35 U.S.C. 154(b) by 1618 days.

(21) Appl. No.: 11/913,950

(22) PCT Filed: Jun. 27, 2006

(86) PCT No.: PCT/EP2006/063602
§ 371 (c)(1),
(2), (4) Date: Nov. 9, 2007

(87) PCT Pub. No.: WO2007/000458
PCT Pub. Date: Jan. 4, 2007

(65) Prior Publication Data
US 2008/0156930 A1 Jul. 3, 2008

(30) Foreign Application Priority Data
Jun. 29, 2005 (FR) ...................................... 05 51821

(51) Int. Cl.
*B64D 27/00* (2006.01)
(52) U.S. Cl.
USPC ........................................................... 244/54
(58) Field of Classification Search
USPC .............. 244/54; 60/796–797, 39.31, 39.091, 60/39.32; 248/554–557; 411/120, 121, 411/132–135, 338, 383, 339
See application file for complete search history.

(56) References Cited

U.S. PATENT DOCUMENTS

| 2,818,225 | A |  | 12/1957 | Kent |
| 4,603,821 | A | * | 8/1986 | White ............................ 244/54 |
| 4,889,458 | A | * | 12/1989 | Taylor .......................... 411/383 |
| 4,943,013 | A | * | 7/1990 | Kapala et al. .................. 244/54 |
| 5,360,303 | A | * | 11/1994 | Behrens et al. .............. 411/120 |
| 5,649,417 | A | * | 7/1997 | Hey ................................. 60/797 |
| 6,669,393 | B2 | * | 12/2003 | Schilling ........................ 403/2 |
| 6,695,557 | B2 | * | 2/2004 | Hove et al. .................... 411/429 |
| 6,843,449 | B1 | * | 1/2005 | Manteiga et al. .............. 244/54 |
| 2002/0104924 | A1 |  | 8/2002 | Roszak |
| 2003/0025033 | A1 | * | 2/2003 | Levert et al. ................... 244/54 |

FOREIGN PATENT DOCUMENTS

EP  1 129 942  9/2001

OTHER PUBLICATIONS

U.S. Appl. No. 12/067,298, filed Mar. 19, 2008, Audart-Noel, et al.

\* cited by examiner

*Primary Examiner* — Tien Dinh
(74) *Attorney, Agent, or Firm* — Oblon, Spivak, McClelland, Maier & Neustadt, L.L.P.

(57) ABSTRACT

An aircraft engine attachment configured to be inserted between an engine and an EMS, the attachment including a plate assembly connected to a first fixing device including an end fitting with two arms and a pin passing through the plate assembly and the two arms, in each of which an orifice is formed including a first ring and a second ring respectively holding the pin. The first ring includes a bottom acting as a stop for a first end of the pin, and the first attachment device includes a mechanism to stop the pin in translation cooperating with a second end of the pin.

15 Claims, 5 Drawing Sheets

ENGINE MOUNT FOR AN AIRCRAFT, TO BE PLACED BETWEEN AN ENGINE AND AN ENGINE MOUNTING STRUCTURE

TECHNICAL DOMAIN

This invention relates in general to an aircraft engine attachment designed to be inserted between an engine and an <<EMS>> (Engine Mounting Structure), used to suspend the engine below the aircraft wing, or to mount this engine above this wing.

The invention also relates to an aircraft engine assembly comprising an engine, an EMS and a plurality of engine attachments inserted between this EMS and the engine, this assembly being useable on any type of aircraft, for example of the type comprising turboshaft engines suspended from the wing, such as turbojets or turboprops.

STATE OF PRIOR ART

On existing aircraft, turboshaft engines are suspended below the wing by complex attachment devices (also called EMSs) through a plurality of engine attachments fixed to the same EMS.

Such an EMS is designed to transmit forces generated by the associated engine to the structure of this aircraft, and is also used for the transfer of fuel, electrical and hydraulic systems and air between the engine and the aircraft.

The EMS comprises a rigid structure, frequently of the <<box>> type, in other words formed by the assembly of upper and lower spars and side panels connected to each other through transverse ribs.

Therefore the engine assembly comprising the EMS and the engine is provided with a plurality of engine attachments inserted between the engine and the rigid EMS structure, this plurality of attachments generally being composed of a forward attachment possibly forming two half-attachments, an aft attachment, and a device for resistance of thrusts generated by the engine. For example in prior art, this device is in the form of two lateral rods connected firstly to an aft part of the engine fan casing, and secondly to the aft attachment fixed to the engine central casing.

For information, note that the EMS is also associated with a mounting system inserted between the rigid structure of this EMS and the aircraft wing, this system normally being composed of two or three attachments.

The usual method used to make engine attachments, and particularly the forward attachment and the aft attachment, is to use a clevis connected to a fixing device comprising an end fitting fitted with two arms, a pin passing through the clevis and the two arms, and two rings holding the pin arranged in the two corresponding orifices formed on the two arms of the end fitting, that for example may be fixed to an engine fan casing.

Means of fixing onto each end of the above-mentioned pin are provided to hold it in the end fitting.

Although this technical solution is extremely widespread in the engine attachments field, it does have a major disadvantage which is that access to the ends of the pin becomes increasingly difficult, particularly due to the trend towards increasing compactness for such engine assemblies. This disadvantage inevitably leads to difficulties in installing these attachments, that are penalising in terms of cost and time. For example, this problem may arise particularly in the case of a forward attachment in which access to the forward end of the pins passing through the clevis may be extremely limited due to the presence of the engine fan casing, which is located so close to this end of the pin that it is practically impossible to manipulate the required tools to fix this pin.

OBJECT OF THE INVENTION

Therefore, the purpose of the invention is to divulge an engine attachment that overcomes the problem described above in embodiments according to prior art, and an aircraft engine assembly comprising at least one such attachment.

To achieve this, the purpose of the invention is an aircraft engine attachment designed to be inserted between an engine and an EMS for this engine, the attachment comprising a plate assembly connected to a first fixing device comprising an end fitting provided with two arms and a pin passing through the plate assembly and the two arms in each of which an orifice is formed, equipped with a first ring and a second ring respectively holding the pin. According to the invention, the first ring is provided with a bottom acting as a stop for a first end of the pin, and the first attachment device also comprises means of stopping the pin in translation, cooperating with a second end of this pin.

Consequently, the invention can provide a technical solution in which it is no longer necessary to provide special fixing means for one of the two ends of the pin, since the pin is therefore supported on the bottom of a ring designed to stop it in translation. In this way, it can be understood that it is advantageously possible to integrate this engine attachment into a densely occupied environment with poor access, and even to make the engine assembly provided with such an attachment even more compact, without worrying about problems of access in this region.

This ingeniously designed attachment that may indifferently be designed as part of a forward engine attachment or an aft engine attachment, it might be preferable to require that pin translation stop means could be installed on the second ring, and that they comprise a nut and a locking nut screwed onto this second ring.

In this configuration, the pin translation stop means forming an integral part of the first fixing device may also comprise at least one spring-washer bearing in contact with the nut, and in contact with the second end of the pin. With this arrangement, it can be understood that the nut that is preferably bearing in contact with a shoulder formed in the second ring is not directly in contact with the second end of the pin, which advantageously avoids overtightening problems that can reduce durability of the rings. This particular design can achieve a determined axial tightening force for maximum clamping of the nut that bears in contact with its associated shoulder, this force naturally being chosen to be compatible with the size of the shoulders provided on these rings and used to hold them in their corresponding end fitting arms, obviously with the objective of preventing any shear in these ring shoulders.

Preferably, the translation stop means also comprise a safety rod passing transversely through the second ring, this rod being arranged at a free end of this second ring so that it can hold the pin in translation if the nut/locknut assembly should come loose/fail. For information, note that this safety rod is also called a <<Fail Safe>> rod.

Also preferably, a ball joint is inserted between the pin and the plate assembly. However, it would also be possible to omit this ball joint and thus obtain a classical end fitting/tenon type connection between the plate assembly and the end fitting, without going outside the framework of the invention.

Preferably, the plate assembly is triangular, and may be a double plate assembly. In this case, it would be possible for this triangular plate assembly to be also connected to a second fixing device identical to the first, these two fixing devices being located close to the two vertices of the triangular plate assembly.

Thus, the configuration obtained in which the triangular plate assembly has two vertices each coupled to a pin, one end of which is housed in a closed ring, is quite suitable for allowing the engine attachment to form two half-attachments, each designed to resist the forces applied along a transverse direction of the engine and along a vertical direction.

To achieve this, this engine attachment may comprise a third fixing device close to a third vertex of the triangular plate assembly, this third fixing device then being designed to be rigidly fixed to the EMS while the first two are designed to be rigidly fixed to the engine.

Another purpose of the invention is an assembly for an aircraft comprising an engine, an EMS and a plurality of engine attachments inserted between the EMS and the engine. According to the invention, the plurality of engine attachments comprises at least one engine attachment like that described above and also according to this invention, and preferably a forward engine attachment like that described above. Obviously, the assembly may also comprise an aft engine attachment designed as described above, without going outside the framework of the invention.

Preferably, the plate assembly is parallel to the transverse direction of the engine, and inclined such that the distance from the engine fan casing increases in the aft direction. This particular configuration was selected so as to determine a relatively large longitudinal spacing between the engine fan casing and the vertex of the plate assembly, and more globally the upper part of the forward attachment, in order to avoid collisions between these two elements. It is well known that the upper part of the fan casing with which this forward attachment is rigidly fixed moves backwards during the various phases of the flight, particularly due to longitudinal bending of the engine. For information, it is noted that another consequence of the mechanical engine displacements is to move the fan casing closer to the forward attachment, and consequently to increase risks of collision with this attachment.

Therefore, it must be understood that the inclined arrangement of the plate assembly advantageously reduces risks of collision, but can increase the longitudinal separation between the EMS supporting this attachment and the fan casing, the inclination of the plate assembly obviously being contrary to the continuous search for compactness. Nevertheless, this increase in longitudinal separation related to the inclination of the plate assembly may be largely compensated by the presence of fixing devices at each closed ring, which no longer require access between the forward end of the connecting pins and the fan casing.

In other words, this preferred configuration implies that the fan casing can be moved significantly closer to the lower part of the forward attachment, without causing any risk of collision between the upper part of the casing and the upper part of the forward attachment located further back than the lower part of this same attachment.

Finally, it is preferred that the end fitting on each of the first two fixing devices is rigidly fixed onto the engine, symmetrically about a vertical plane passing through a longitudinal axis of this engine.

Other advantages and characteristics of the invention will become clear by reading the non-limitative detailed description given below.

BRIEF DESCRIPTION OF THE DRAWINGS

This description will be made with reference to the appended drawings among which.

DETAILED DESCRIPTION OF PREFERRED EMBODIMENTS

Figure 1:
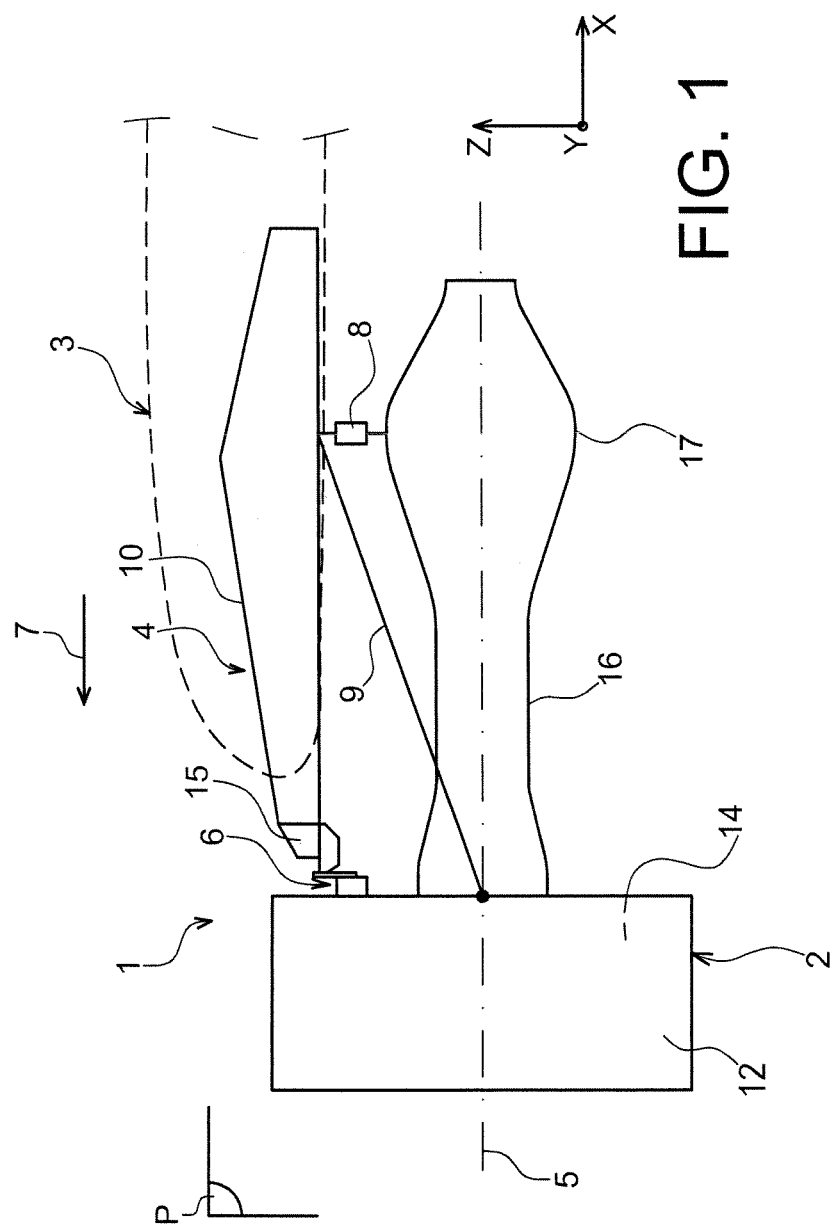
FIG. 1 represents a partially schematic side view of an aircraft engine assembly according to a preferred embodiment of this invention.

FIG. 1 shows an aircraft engine assembly 1 designed to be fixed under a wing of this aircraft (shown only diagrammatically and marked as numeric reference 3), this assembly 1 being in the form of a preferred embodiment of this invention.

Globally, the engine assembly 1 is composed of an engine such as a turbojet 2, an EMS 4 and a plurality of engine attachments 6, 8, 9 inserted between a rigid structure 10 of the EMS 4 and the turbojet 2. For guidance, note that the assembly 1 is designed to be surrounded by a pod (not shown) and the EMS 4 is fitted with another series of attachments (not shown) to suspend this assembly 1 under the aircraft wing.

In all of the following description, by convention, X is the longitudinal direction of the EMS 4 that can be considered to be the same as the longitudinal direction of the turbojet 2, this direction X being parallel to the longitudinal axis 5 of this turbojet 2. Furthermore, Y is the direction transverse from the EMS 4 and can also be considered to be the same as the turbojet 2, and Z is the vertical direction or the height, these three directions X, Y and Z being orthogonal to each other.

Furthermore, the terms <<forward>> and <<aft>> should be considered with respect to the direction of motion of the aircraft under the effect of the thrust applied by the turbojet 2, this direction being shown diagrammatically by the arrow 7.

FIG. 1 schematically shows the engine attachments 6, 8, 9, only including the rigid structure 10 of the EMS 4. The other constituents of this EMS 4 not shown, such as the means of attachment of the rigid structure 10 under the aircraft wing, or the secondary structure controlling segregation and support of systems while supporting aerodynamic fairing, are classical elements identical or similar to those encountered in prior art or known to an expert in the subject. Consequently, no detailed description of them will be given.

Moreover, the rigid structure 10 of the EMS 4 that transmits forces is also of a known design, since it is preferably in the form of a <<box>> formed by the assembly of spars and side panels connected to each other through transverse ribs. One end in the form of a fitting 15 can be seen at a forward part of this rigid structure 10, onto which the engine attachment 6 is fixed.

Furthermore, the turbojet 2 is provided with a large sized fan casing 12 at the forward end, delimiting an annular fan duct 14, and near the aft end comprises a smaller central casing 16 containing the heart of this turbojet. Finally, the central casing 16 is prolonged towards the aft direction by an ejection casing 17 larger than the casing 16. Obviously, the casings 12, 16 and 17 are fixed to each other.

As can be seen on FIG. 1, the plurality of engine attachments is composed of a forward engine attachment 6 actually forming two forward half-attachments, an aft engine attachment 8, and an attachment 9 forming a device to resist thrust forces generated by the turboshaft engine 2. As shown schematically on FIG. 1, this device 9 may for example be in the form of two lateral connecting rods (only one being visible in the figure because it is a side view), connected firstly to an aft part of the fan casing 12 and secondly to the aft attachment 8.

This aft engine attachment 8 is classically designed so that it can only resist forces generated by the turbojet 2 along the Y direction and along the Z direction, and therefore not those applied along the X direction. It is inserted between the ejection casing 17 and a lower spar of the rigid structure 10 of the EMS.

On the other hand, the forward engine attachment 6 rigidly fixed to the fitting 15 and to the fan casing 12, forms one of the special features of the invention and will be described in more detail with reference to FIGS. 2 to 4. For information, this forward attachment 6 preferably penetrates into an internal portion of the fan casing to which the fixed fan blades are attached, and is close to a forward end of the central casing. It is designed to form two half-attachments arranged symmetrically about a plane P defined by the axis 5 and the Z direction, the design of this attachment 6 being such that it can resist forces generated by the turbojet 2 along the Y direction and along the Z direction, but not forces along the X direction.

In this way, forces applied along the X direction are resisted using attachment 9, forces along the Y direction are resisted by the forward attachment 6 and the aft attachment 8, and forces along the Z direction Z are resisted through attachments 6 and 8 jointly.

Furthermore, the moments about the Y and Z directions are resisted vertically and transversely by the two attachments 6 and 8 respectively, while the moment about the X direction is resisted solely by the aft attachment 8 that may also use a design of the type with two half-attachments.

Figure 2:
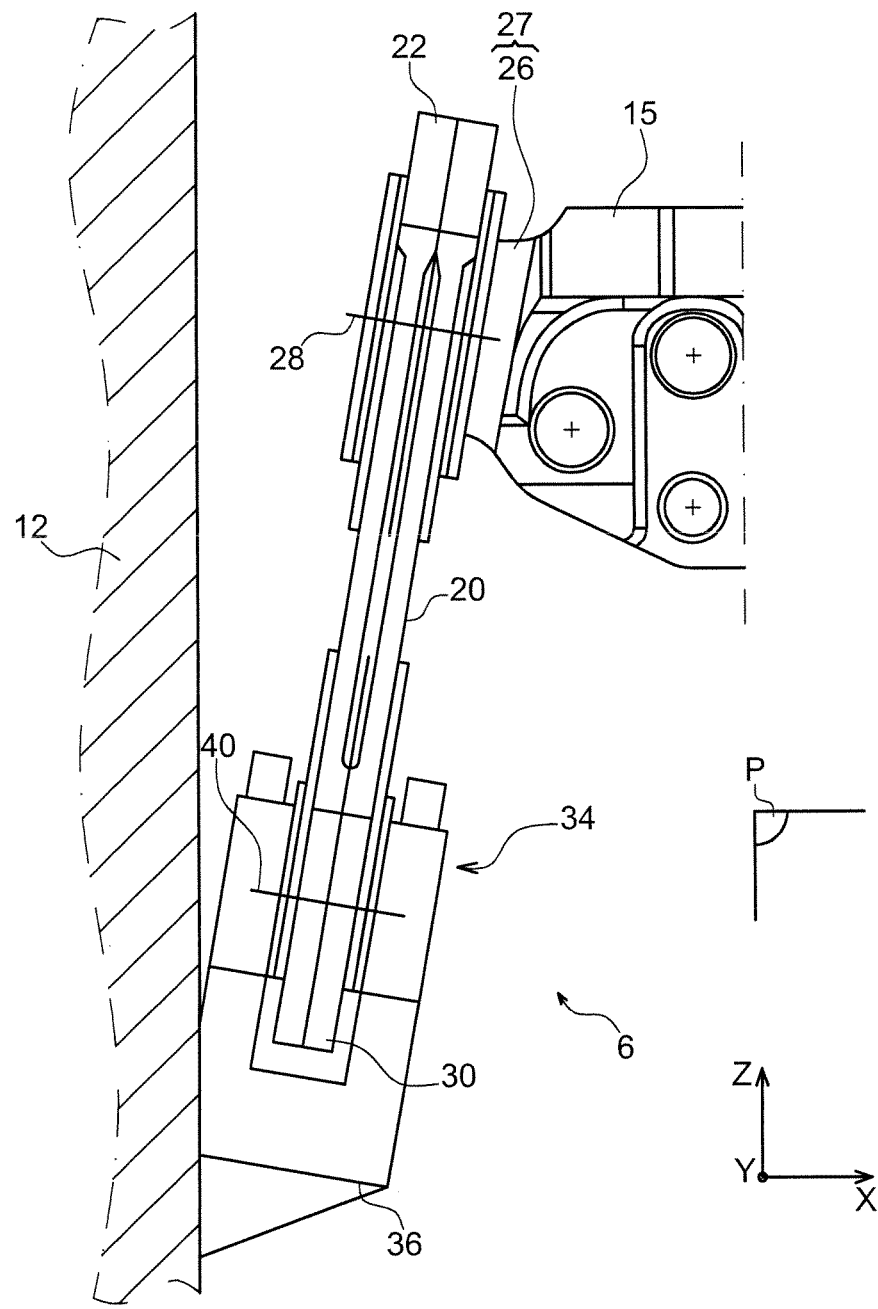
FIG. 2 represents an enlarged and detailed side view of a forward engine attachment of the assembly shown in FIG. 1.
Figure 3:
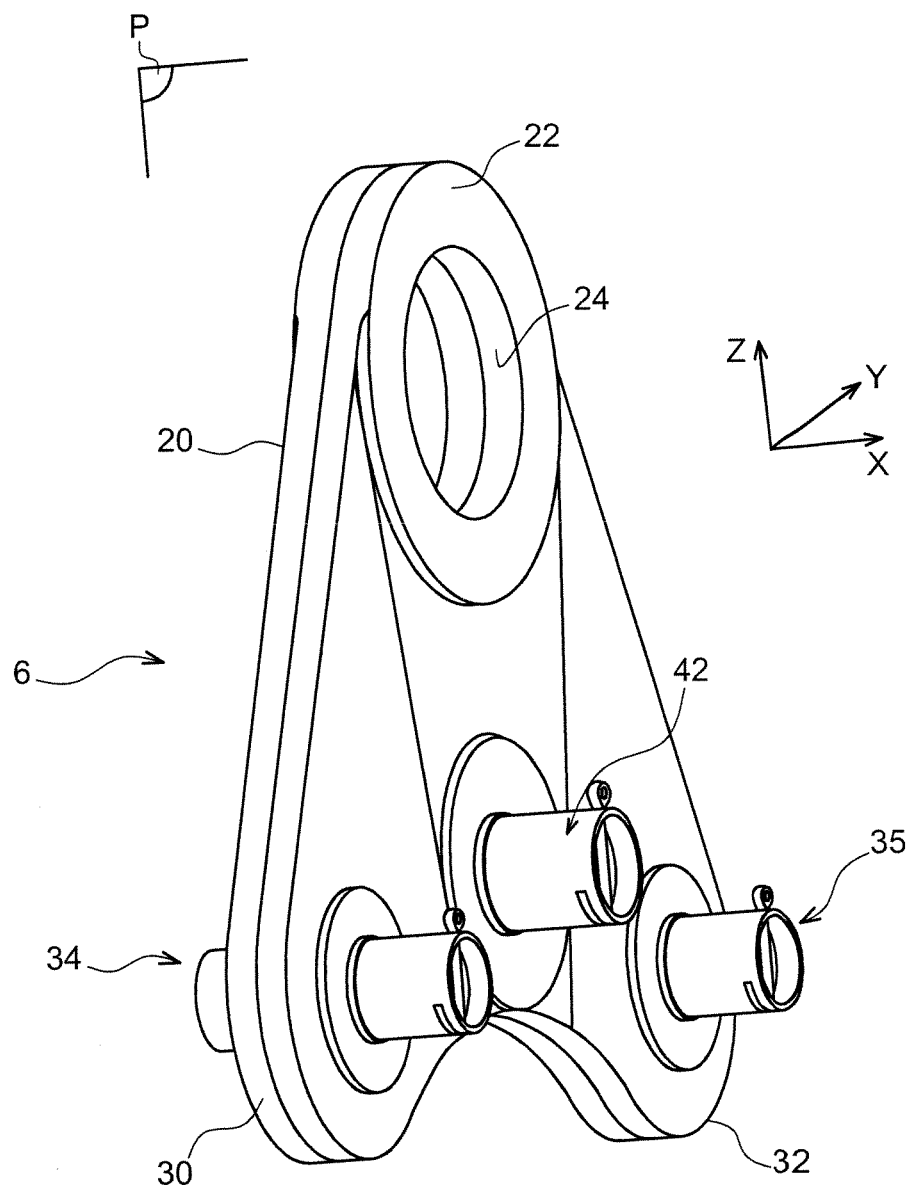
FIG. 3 represents a perspective view of part of a forward engine attachment shown on FIG. 2.

With reference to FIGS. 2 and 3 together, it can be seen that the attachment 6 comprises a triangular plate assembly 20, preferably a double plate assembly, that passes through the plane P symmetrically with a vertex 22 at the top.

A through orifice 24 is provided at the vertex 22 of this plate assembly, in which fits a connecting pin 26 rigidly fixed to the EMS fitting 15. Preferably, a ball joint (not shown) is housed in the orifice 24 to hold the pin 26. Thus, the ball joint and the connection pin 26 jointly form an attachment device 27 of the plate assembly 20 onto the EMS rigid structure.

As can be seen better on FIG. 2, the plate assembly 20 is globally arranged in a plane parallel to the Y direction and inclined so that the distance from the fan casing 12 increases towards the aft direction. Consequently, the centre line 28 of the orifice 24 coincident with the centre line of the pin 26 is slightly inclined from the X direction, in an XZ plane so that its height increases in the forward direction.

Another consequence of the inclination of this plate assembly 20 is that its upper part, and therefore its vertex 22, is further from the fan casing 12 than the lower part of this triangular plate assembly 20 containing its other two vertices 30, 32.

Each of these two lower vertices 30, 32 close to the fan casing 12 are provided with a through orifice (non visible) cooperating with a first attachment device 34 and a second attachment device 35 with identical design, these devices each comprising an end fitting rigidly fixed to the fan casing 12 (only the end fitting 36 of the first attachment device 34 being visible on FIG. 2). Obviously, in this configuration in which the two devises are arranged symmetrically about the plane P and are rigidly fixed onto the internal portion of the fan casing onto which the fan fixed blades are attached, the centre lines 40 of the two through orifices associated with the vertices 30, 32 are parallel to the centre line 28, and therefore also slightly inclined from the X direction, in an XZ plane, so that their height increases in the forward direction.

For guidance, note that the plate assembly 20 is also provided with a fourth attachment point equipped with a safety fixation system 42 mounted on the fan casing. This fourth attachment point, also called a <Fail Safe>> attachment point, transmits forces to the EMS rigid structure only if there is a failure of one of the other two attachment points at the vertices 30, 32.

It should also be understood that the particular symmetric arrangement of these two lower attachment points incorporating the first and second attachment points 34, 35 respectively makes it possible to obtain the two half-engine attachments mentioned above.

Figure 4:
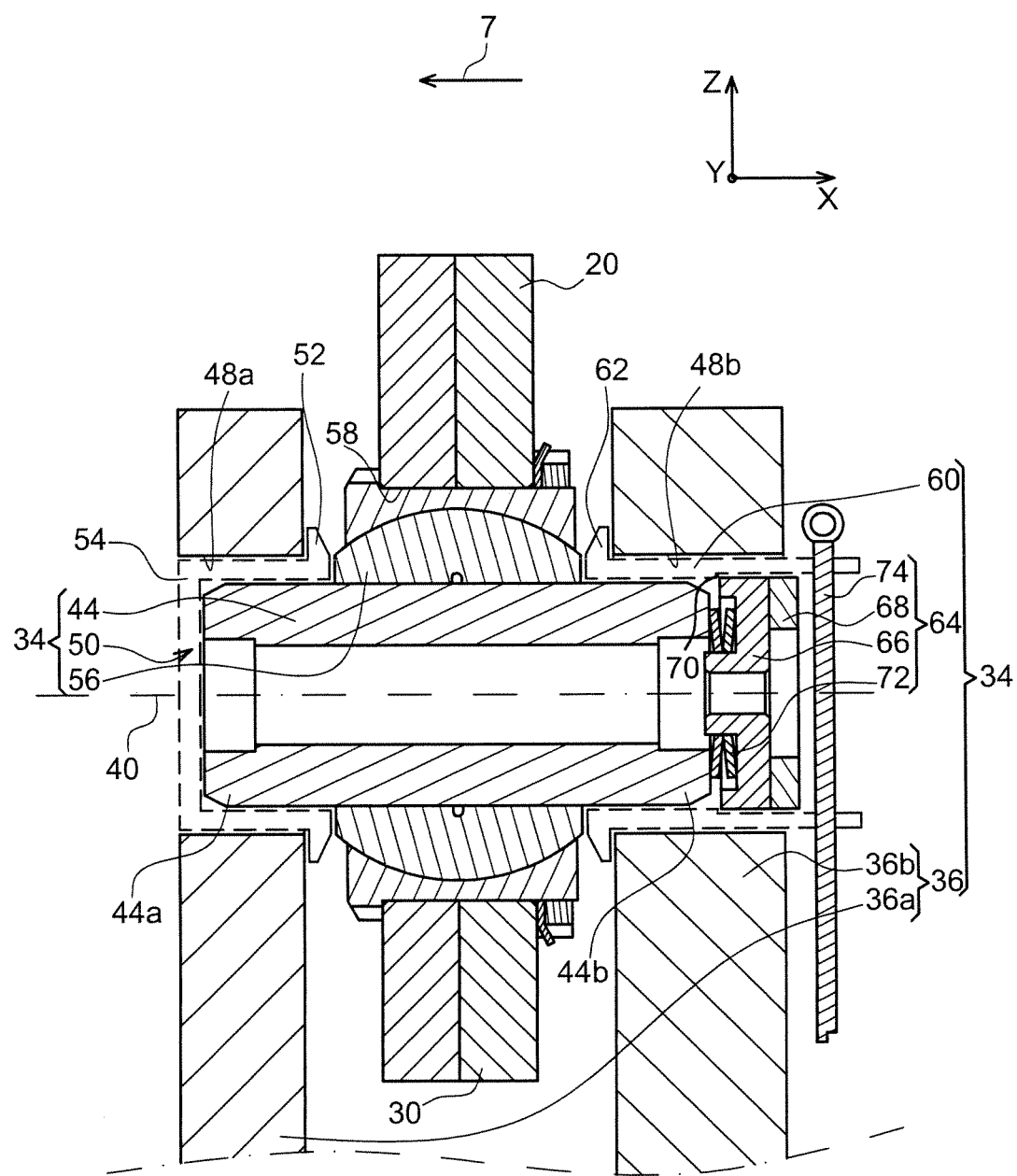
FIG. 4 represents a sectional view of part of the forward engine attachment shown on FIGS. 2 and 3.

With reference to FIG. 4, we will now describe the lower attachment point incorporating the first fixing device 34, in other words the fixing device at the vertex 30. Since the other lower attachment point is practically identical, it will not be described in more detail.

Globally, the fixing device 34 includes the end fitting 36 called the female end fitting and being formed from a forward arm 36a and an aft arm 36b between which there are the lower vertex 30 of the plate assembly 20 and a so-called connecting pin 44 passing through this plate assembly 20 and the two arms 36a, 36b. In this respect, note that the connecting pin 44 arranged along the centre line 40 does not necessarily pass through the arms 36a, 36b from one side to the other, but at least partially penetrates into each of these arms.

The forward arm 36a is provided with a through orifice 48a along the direction of the centre line 40, in which a first ring 50 is located. This ring comprises a shoulder 52 bearing in contact with an inner surface of the arm 36a, stopping it in translation in the forward direction. Another special feature of the invention is that this ring 50 into which the pin 44 fits is provided with a closed-off end 54 located at a forward end of this ring 50.

Therefore the closing-off wall 54 of the ring 50 belonging to the first fixing device 34 forms a stop for a first end or forward end 44a of the pin 44, to the extent that a search is preferably made for a direct contact between this end 44a and the closing-off wall 54 oriented perpendicular to the centre line 40.

The central part of the connecting pin 44 is preferably arranged to pass through a ball joint 56 also belonging to the first fixing device 34, and being located inside the through orifice 58 formed at the vertex 30 of the triangular plate assembly 20.

The first fixing device 34 also comprises a second ring 60 housed in a through orifice 48b of the aft arm 36b, this orifice 48b being oriented along the direction of the centre line 40. The ring 60 also has a shoulder 62 bearing in contact with an internal surface of the arm 36b, stopping it in translation in the aft direction. Consequently, each of the two rings 50, 60 fits onto the end fitting 36 by inserting them in their corresponding orifices from the space defined between the two arms 36a, 36b.

In the raised position, the connecting pin 44 penetrates into the ring 60, in which its second end or aft end 44b is retained at the aft direction through translation stop means 64, also belonging to the device 34.

More precisely, the translation stop means 64 comprise a nut 66 and a locknut 68 centred on the centre line 40 and screwed inside the second ring 60 from a free end of this second ring, the nut 66 bearing in contact with a shoulder 70 on the inside of this ring 60. However, the attachment is designed such that the aft end 44b of the pin 44 is forward from the shoulder 70, to prevent contact between this end 44b and the nut 66 that could reduce the durability of the rings 50, 60. Thus, the translation stop means 64 are also provided with one or several spring-washers 72, bearing firstly in contact with the nut 66 and secondly in contact with the second end 44b of the connecting pin 44. With this arrangement, the axial clamping force of the pin 44 and the stress in the rings 50, 60 are fully controlled.

Finally, note that the translation stop means 64 also comprise a safety rod 74 passing transversely through the second ring 60, preferably diametrically, this <<Fail Safe>> type rod 74 being arranged at the free aft end of this second ring 60, aft from the locknut 68. Naturally, if there is any failure in the translation stop means 64, the rod 74 prevents extraction of the nut 66, the locknut 68 and the pin 44 escaping from the aft ring 60.

Obviously, an expert in the subject could make various modifications to the engine attachment and the aircraft engine assembly described above as non-limitative examples. For example, in this respect it is noted that the forward engine attachment could comprise a classically shaped clevis with two opposite ends, instead of having a triangular shape. In such a case, one of the two ends could be equipped with a closed-off attachment ring like that described above.

Figure 5:
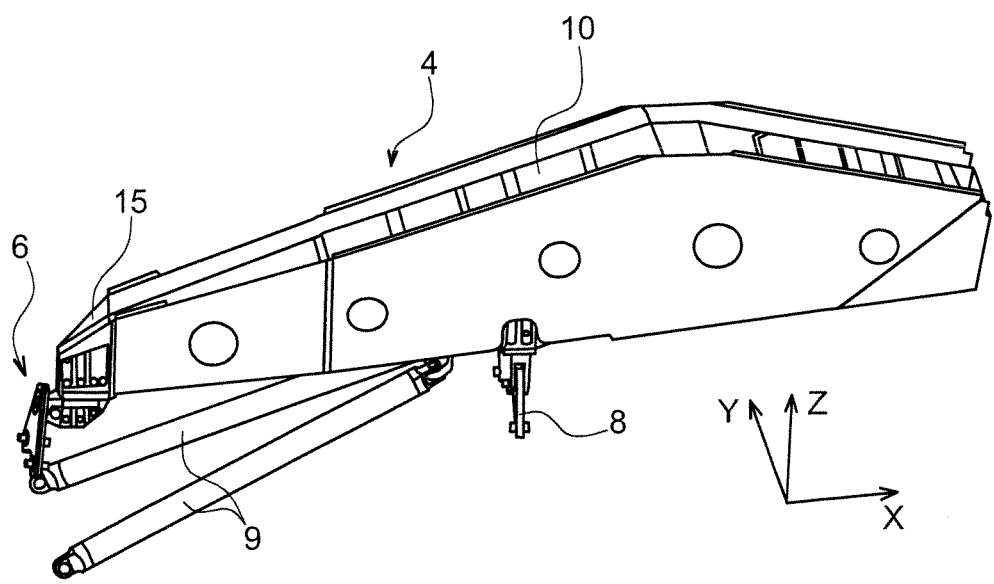
FIG. 5 represents a perspective view of an aircraft engine assembly according to a preferred embodiment of this invention (the engine is not shown).

Furthermore, the invention could also be applied in a configuration in which the aft ends of the connecting rods 9 are hinged onto a spreader that is mounted forward from the aft engine attachment 8 rather than on its body, and in the aft direction from the forward engine attachment 6, always preferably on a lower spar of the rigid structure 10 as can be seen on FIG. 5 representing another embodiment of this invention.

The invention claimed is:

1. An aircraft engine attachment configured to be inserted between an engine and an engine mounting structure (EMS) for the engine, the attachment comprising:
   a plate assembly connected to a first fixing device including an end fitting with two arms and a pin passing through the plate assembly and the two arms, each of the arms having an orifice including a first ring and a second ring respectively holding the pin,
   wherein a bottom of the first ring acts as a stop for a first end of the pin,
   wherein the first fixing device includes means for stopping the pin in translation cooperating with a second end of the pin,
   wherein the pin translation stop means stops the translation of the pin by pushing the pin against said bottom of the first ring, and
   wherein the pin and the first ring are disposed entirely within outer surfaces of the two arms of the aircraft engine attachment.

2. An engine attachment according to claim 1, wherein the pin translation stop means is installed on the second ring.

3. An engine attachment according to claim 1, further comprising a ball joint inserted between the pin and the plate assembly.

4. An engine attachment according to claim 1, wherein the plate assembly is triangular.

5. An engine attachment according to claim 4, wherein the triangular plate assembly is also connected to a second fixing device identical to the first fixing device, the first and second fixing devices being located close to two vertices of the triangular plate assembly.

6. An engine attachment according to claim 5, wherein the aircraft engine attachment forms two half-attachments each configured to resist forces applied along a transverse direction and along a vertical direction of the engine.

7. An engine attachment according to claim 6, further comprising a third fixing device close to a third vertex of the triangular plate assembly, the third fixing device configured to be rigidly fixed to the EMS.

8. An assembly for an aircraft comprising:
   an engine;
   an EMS; and
   a plurality of engine attachments inserted between the EMS and the engine, wherein the plurality of engine attachments comprise at least one engine attachment according to claim 1.

9. An assembly according to claim 8, wherein the engine attachment is a forward attachment.

10. An assembly according to claim 9, wherein the plate assembly is parallel to a transverse direction of the engine, and inclined such that a distance from a fan casing of the engine increases in the aft direction.

11. An assembly according to claim 10, wherein the end fitting on each of the first two fixing devices is rigidly fixed onto the engine, symmetrically about a vertical plane passing through a longitudinal axis of the engine.

12. An engine attachment configured to be inserted between an engine and an engine mounting structure (EMS) for the engine, the attachment comprising:
   a plate assembly connected to a first fixing device including an end fitting with two arms and a pin passing through the plate assembly and the two arms, each of the arms having an orifice including a first ring and a second ring respectively holding the pin,
   wherein the first ring includes a bottom acting as a stop for a first end of the pin, and wherein the first fixing device includes means for stopping the pin in translation, cooperating with a second end of the pin, and
   wherein the pin translation stop means includes a nut and a locking nut screwed onto the second ring of the engine attachment.

13. An engine attachment according to claim 12, wherein the pin translation stop means also includes at least one spring-washer in contact with the nut and in contact with the second end.

14. An engine attachment according to claim 13, wherein the nut is in contact with a shoulder formed in the second ring.

15. An engine attachment according to claim 14, wherein the translation stop means also includes a safety rod passing transversely through the second ring.

* * * * *